United States Patent
Deniau et al.

(10) Patent No.: US 8,653,831 B2
(45) Date of Patent: Feb. 18, 2014

(54) METHOD OF GENERATING A SCENARIO OF ELECTROMAGNETIC NOISE

(75) Inventors: Virginie Deniau, Raches (FR); Nedim Ben Slimen, Villeneuve-d'ascq (FR); Jean Rioult, Lille (FR)

(73) Assignee: Institut Francais des Sciences et Technologies des Transports, de l'Amenagement et des Reseaux—IFSTTAR, Bron Cedex (FR)

( * ) Notice: Subject to any disclaimer, the term of this patent is extended or adjusted under 35 U.S.C. 154(b) by 341 days.

(21) Appl. No.: 13/003,605

(22) PCT Filed: Jul. 10, 2009

(86) PCT No.: PCT/FR2009/051377
§ 371 (c)(1),
(2), (4) Date: Apr. 26, 2011

(87) PCT Pub. No.: WO2010/004226
PCT Pub. Date: Jan. 14, 2010

(65) Prior Publication Data
US 2011/0187387 A1  Aug. 4, 2011

(30) Foreign Application Priority Data
Jul. 11, 2008  (FR) ..................... 08 54734

(51) Int. Cl.
*G01R 29/00* (2006.01)
(52) U.S. Cl.
USPC ....................................... 324/612

(58) Field of Classification Search
USPC ............... 324/612, 762.01–762.1; 340/686.1; 257/48; 438/14–18
See application file for complete search history.

(56) References Cited

U.S. PATENT DOCUMENTS

| | | | |
|---|---|---|---|
| 5,794,128 A | 8/1998 | Brockel et al. | |
| 6,944,565 B2 * | 9/2005 | Mcneilage et al. | 702/106 |
| 8,306,803 B2 * | 11/2012 | Clement | 703/14 |
| 2007/0127559 A1 | 6/2007 | Chang | |

FOREIGN PATENT DOCUMENTS

| | | |
|---|---|---|
| FR | 2877514 A | 5/2006 |
| WO | 0209313 A | 1/2002 |
| WO | 2006048516 A2 | 5/2006 |

OTHER PUBLICATIONS

French Search Report, dated Apr. 3, 2009, in FA 712384/FR 0854734.

* cited by examiner

*Primary Examiner* — Tung X Nguyen
(74) *Attorney, Agent, or Firm* — Young & Thompson (57) ABSTRACT

Method of generating a scenario of electromagnetic noise for monitoring the reliability of a sensitive apparatus, characterized in that it includes the steps consisting in: defining environmental electromagnetic conditions relating to the environment of the sensitive apparatus, determining a positioning of the sensitive apparatus in the environment, and generating, on the basis of the environmental electromagnetic conditions and of the positioning of the sensitive apparatus, a scenario of electromagnetic noise including a set of permanent noises and a set of transient noises.

7 Claims, 6 Drawing Sheets

TGV ☒   TER ☐   FREIGHT ☐

Length of the journey [ ]   Commerical speed [ ]

Number of stations passed through [ ]

Distance in rural zone [ ]   Distance in urban zone [ ]

Type of locomotive [ ]   Age of the locomotive [ ]

FIG.6

Telecommunication device ☒   Electronic device ☐

GSM-R
WIFI
Ground/train radio
TNT
...

FIG.7

Type of antenna
- 440-470MHz&870-960MHz dual-band omidirectional
- 870-960MHz band omidirectional
- ...
- Other antenna Antenna-pantograph distance [ ]

FIG.8

Amplitude modulation coefficient

----- A 925MHz downlink GSM channel
——— Several TV channels
······ 107.7MHz radio transmitter Departure town   Arrival town

METHOD OF GENERATING A SCENARIO OF ELECTROMAGNETIC NOISE

BACKGROUND OF THE INVENTION

1. Field of the Invention

The subject of the present invention is a method of generating a scenario of electromagnetic noises.

2. Description of the Related Art

Currently, to monitor the reliability of a radioelectric communication, one generally determines the minimum amplitude of the useful signal as a function of the coverage of the network and the minimum "signal-to-noise" ratio for attaining the desired communication quality. This makes it possible to fix a maximum electromagnetic noise template, the template indicating the noise level above which the communication might be scrambled.

This approach is no longer applicable with the new digital telecommunication systems, on account of their complexity and the increase in the frequencies used. In particular, when a telecommunication signal encounters a disturbance, it is mainly the impact on the binary error rate (BER) which will be decisive as regards the success or the failure of transmission. Now, the effect of a radioelectric disturbance on the binary error rate is not solely related to the amplitude of the disturbance but on the contrary depends mainly on its duration and its repetition.

Thus, a very high amplitude but very brief disturbance may pass unnoticed whereas a long-lasting disturbance or a disturbance which is brief but repeated at short time intervals, of lesser amplitude, will degrade the binary error rate more and might even totally prevent the establishment of the communication.

Moreover, in the high frequencies henceforth used, the briefest disturbances turn out to be the most penalizing. Indeed, the briefest phenomena cover a significant spectral spread.

Furthermore, miniaturization of components in electronics and power electronics is giving rise to ever faster state changes, as well as an increase in the number of transient periods and in the sensitivity of apparatuses with respect to exterior disturbances.

Moreover, the effect of the increase in the speed of vehicles is an increase in the mechanical phenomena from which the disturbances originate, as well as an increase in the base changes from which the disturbances originate.

For all these reasons, the traditional schemes for verifying or managing electromagnetic compatibility are ever more unsuitable for monitoring radio communications transmitted by contemporary telecommunication systems.

BRIEF SUMMARY OF THE INVENTION

The aim of the present invention is to propose a method of generating a scenario of noises which makes it possible to monitor the reliability of a sensitive apparatus while avoiding the aforementioned drawbacks.

For this purpose, the subject of the invention is a method of generating a scenario of electromagnetic noises for monitoring the reliability of a sensitive apparatus, characterized in that it comprises the steps consisting in:

defining environmental electromagnetic conditions relating to the environment of the sensitive apparatus,
determining a positioning of the sensitive apparatus in said environment, and
generating, on the basis of said environmental electromagnetic conditions and of said positioning of the sensitive apparatus, a scenario of electromagnetic noises comprising a set of permanent noises and a set of transient noises.

Preferably, the method comprises steps consisting in programming a signal generator with said scenario of electromagnetic noises, and in transmitting, with the aid of said signal generator, a signal corresponding to said scenario of electromagnetic noises destined for said sensitive apparatus.

According to one embodiment of the invention, said environment being a train, the method comprises a step consisting in fixing at least one parameter from among the length of the journey, the duration of the journey, the maximum speed, the type of electrification of the line, the age or the state of the catenary and the existence of neutral sections, said at least one parameter being taken into account to generate said scenario of electromagnetic noises.

Advantageously, the method comprises a step consisting in fixing at least one characteristic relating to the input stage of said sensitive apparatus, said at least one characteristic being taken into account to generate said scenario of electromagnetic noises.

The subject of the invention is also a digital machine programmed to implement the method of generating a scenario of electromagnetic noises.

The subject of the invention is also a signal generator programmed with a scenario of electromagnetic noises obtained by the execution of the method of generating a scenario of electromagnetic noises.

BRIEF DESCRIPTION OF THE DRAWINGS

The invention will be better understood, and other aims, details, characteristics and advantages thereof will be more clearly apparent in the course of the detailed explanatory description which follows, of several embodiments of the invention, given by way of purely illustrative and nonlimiting examples, with reference to the appended schematic drawings.

In these drawings.

DETAILED DESCRIPTION OF THE PREFERRED EMBODIMENTS

The subject of the invention is a method of generating a scenario of noises, usable for monitoring the reliability of a sensitive apparatus (not represented), which may be, for example, an electronic device, a sensor or a telecommunication system. Within the meaning of the invention, the term "noise" designates an electromagnetic noise, and the term "reliability" designates the reliability of an apparatus faced with electromagnetic disturbances.

Figure 1:
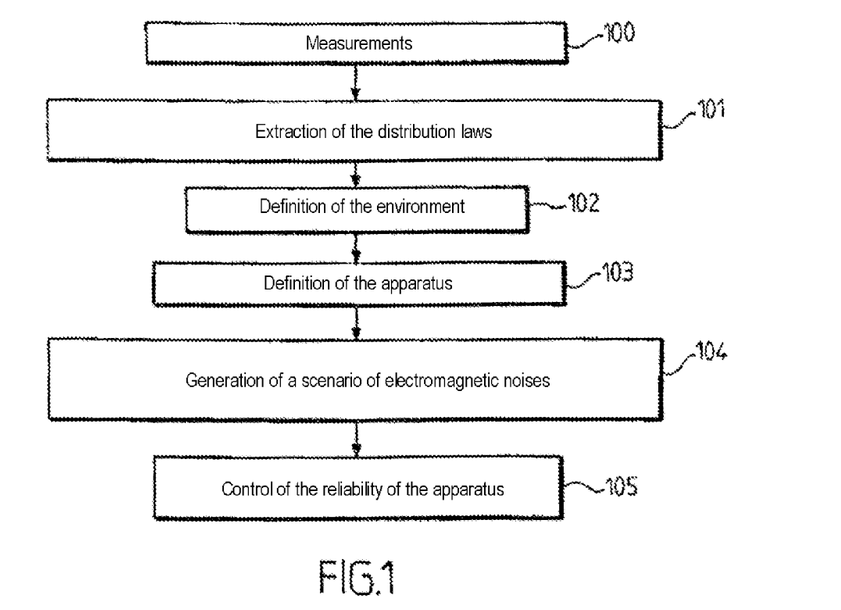
FIG. 1 is a functional diagram showing the steps of a method of generating a scenario of electromagnetic noises according to one embodiment of the invention.

Referring to FIG. 1, steps 100 and 101 of the method are preliminary steps of constructing a database.

Step 100 consists in performing prior measurements of electromagnetic noises within varied environments and in storing data relating to these measurements.

Step 101 consists in analyzing the data stored in step 100 so as to extract therefrom statistical laws for the distribution of the characteristic parameters of the electromagnetic noises.

Figure 2:
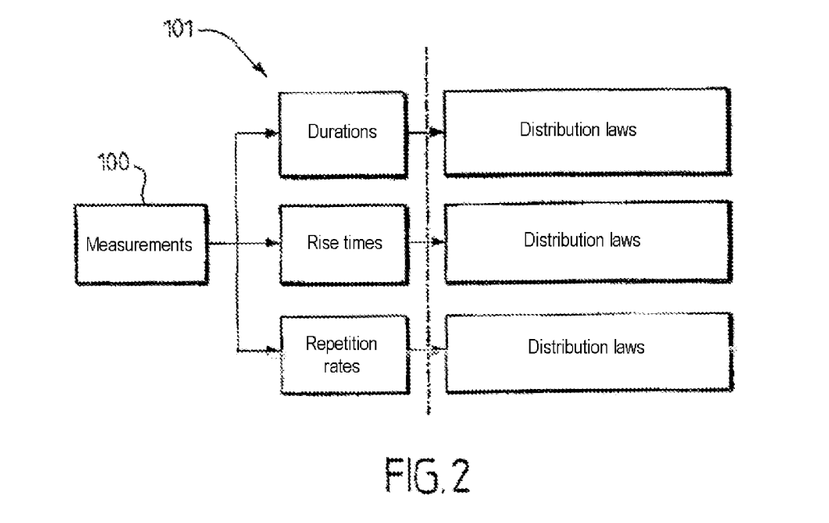
FIG. 2 is a functional diagram showing sub-steps of the method of FIG. 1 allowing the construction of a database.

FIG. 2 shows the sub-steps of the analysis of data of step 101.

Figure 3:
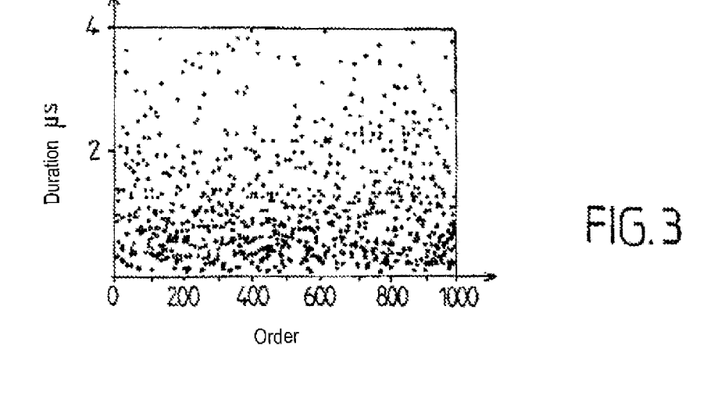
FIG. 3 is a graph showing the duration of a thousand transient events.

Initially, the method studies the durations, the rise times, and the repetition rate of the stored electromagnetic noises. FIG. 3 shows, by way of example, a graph representing the duration of a thousand transient events. The rise time and the repetition rate of the events are studied in a similar manner.

Thereafter, the method determines distribution laws (and their parameters) for the durations, for the rise times and for the repetition rate, as a function of the measurement conditions (speed, type of electrification, for example).

Figure 4:
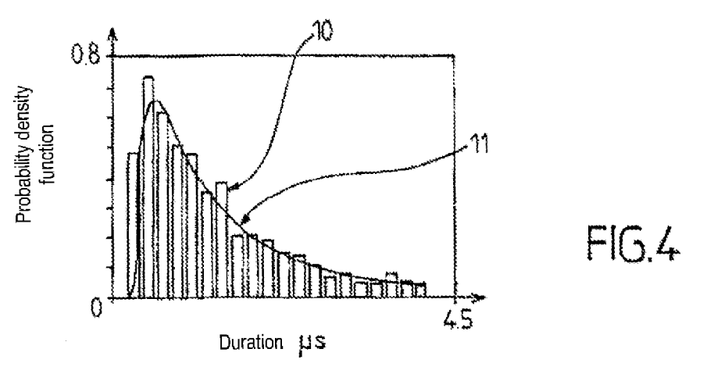
FIG. 4 is a graph showing the probability density of the durations of the transient events of FIG. 3.

For this purpose, the method determines the statistical law which most closely approximates the distribution of each temporal characteristic of the transient events. The probability density of the durations of the transient events of FIG. 3 is represented in FIG. 4. In this figure, the bar graph represents the experimental distribution and the curve 11 represents the empirical probability density estimated on the basis of the experimental distribution. Curve 11 represents the probability density function of the Lognormal law which may be written as follows:

$$f(D/\mu, \sigma) = \frac{1}{D\sigma\sqrt{2\Pi}} \exp\left(-\frac{(\ln(D) - \mu)^2}{2\sigma^2}\right)$$

With D the duration of the collected events, $\mu$ the mean of the law and $\sigma$ the standard deviation of the law. The parameters $\mu$ and $\sigma$ are determined with the aid of the maximum likelihood scheme making it possible to reduce the deviation between the estimated and experimental probability density function. For example, $\mu=-0.17$ and $\sigma=0.84$.

The rise times and the repetition rate of the transient events are processed in a similar manner.

The method stores the statistical distribution laws in a database which will subsequently be used to determine a scenario of noises.

Step 102 of the method consists in defining environmental electromagnetic conditions relating to the environment of the sensitive apparatus, for example the type of transport means (train, car, or other) onboard which the sensitive apparatus is carried, or the type of installation (industrial or residential building) in which it is situated.

Figure 5:
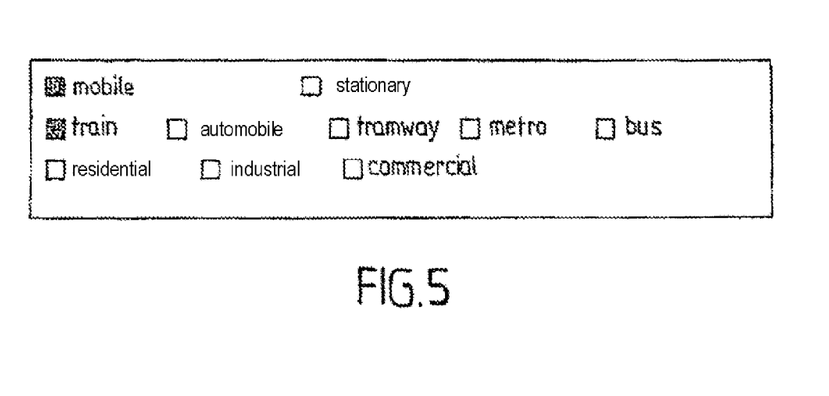
FIG. 5 represents a graphical interface allowing a user to define environmental conditions.
Figure 6:
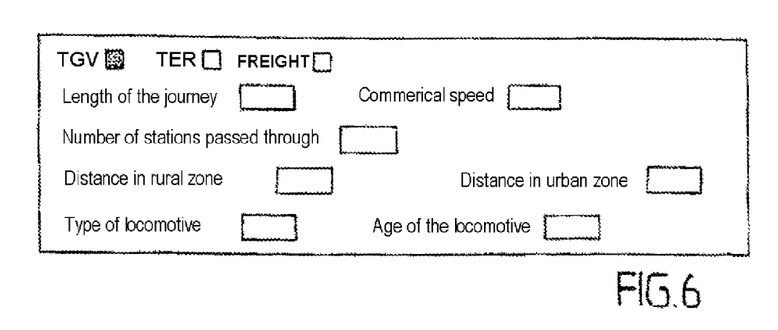
FIG. 6 represents a second graphical interface allowing a user to define environmental conditions.

FIG. 5 represents an exemplary graphical interface allowing a user to define the environmental conditions. The user selects on the graphical interface one or more box(es) characterizing the environment. For example, when the user selects the "mobile" and "train" boxes, a second graphical interface (FIG. 6), dependent on the box or boxes selected, appears on the screen so as to allow a more accurate definition of the environment. In the example, the user specifies that it is a high-speed train (TGV in French).

As a variant, a third graphical interface can then be displayed on the screen so as to allow the user to choose from among a list of lines on the basis of the departure and arrival towns. Thus, the various items of information relating to the line such as the number of railroad stations passed through, the neutral sections, the type of electrification, the age or the state of the line, the distances traversed in rural and urban zones may be filled in previously.

Generally, the number of successively displayed graphical interfaces depends on the precision desired for the definition of the environment.

Step 103 of the method consists in determining a positioning of the sensitive apparatus, especially the position of the antennas and receivers of the sensitive apparatus in the vehicle or the building or the like.

Figure 7:
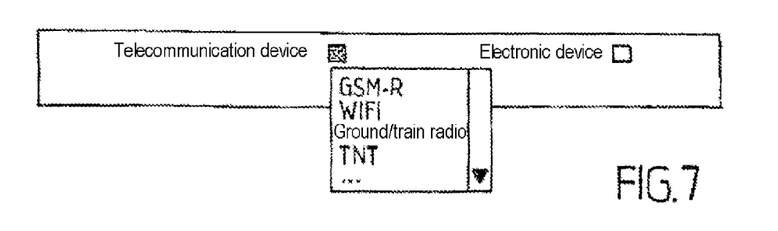
FIG. 7 represents a graphical interface allowing a user to define the apparatus to be tested.
Figure 8:
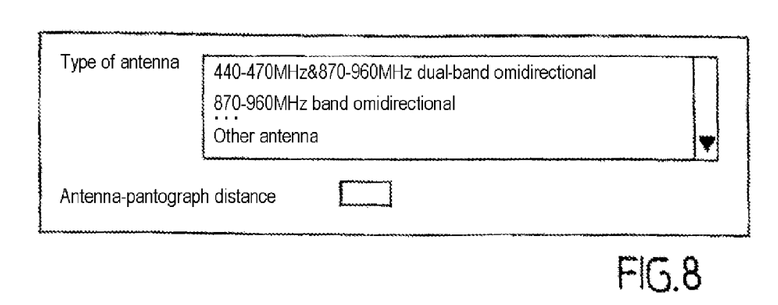
FIG. 8 represents a second graphical interface allowing a user to define the apparatus to be tested.

FIG. 7 represents a graphical interface allowing a user to provide information about the apparatus. The choice of the telecommunication system makes it possible to automatically determine the sensitive frequencies, the complete topology of the system aboard the train and the positions of the antennas (for example on the roof, under the train, in a passenger car, in the locomotive, or other). It also makes it possible to propose a list of the type of relevant antennas (FIG. 8).

Step 104 of the method consists, on the basis of the environmental electromagnetic conditions and of the positioning of the sensitive apparatus, which were determined in the previous steps, in generating a scenario of noises. For this purpose, the method uses the database constructed and stored in step 101.

The database makes it possible to identify elementary permanent noises and elementary transient noises.

Figure 9:
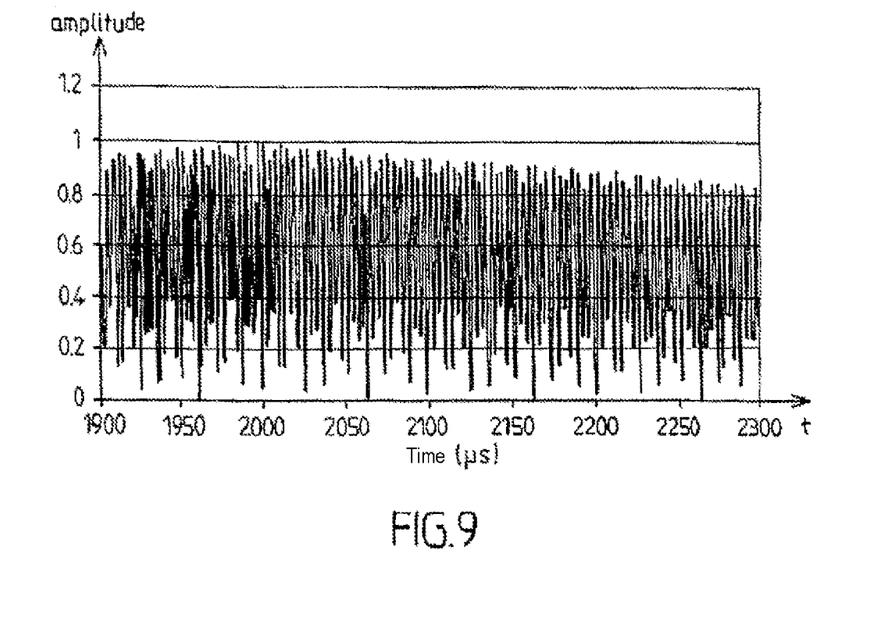
FIG. 9 is a graph showing a curve representing, as a function of time, the amplitude of an elementary permanent noise.

FIG. 9 shows an amplitude-modulated sinusoid, which defines an elementary permanent noise. The amplitude modulation makes it possible to simulate movement either away from or toward the source, or a variation in the power emitted by the noise source.

Figure 10:
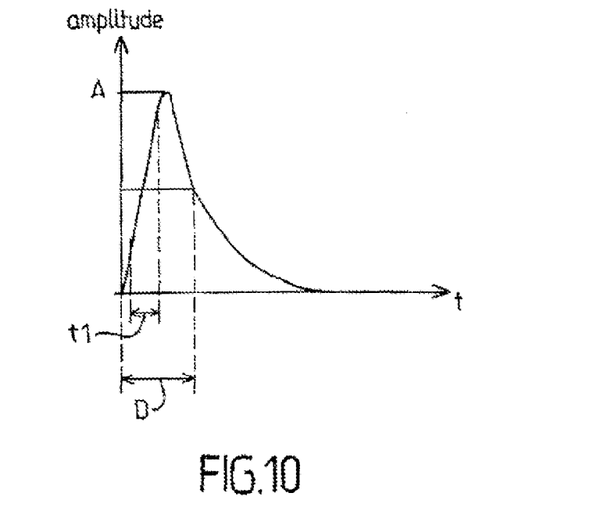
FIG. 10 is a graph showing a curve representing, as a function of time, the amplitude of an elementary transient noise.

FIG. 10 shows an elementary transient noise, which is defined by a rise time t1, a duration D and an amplitude A.

The method thus extracts a scenario of permanent noises and a scenario of transient noises.

Figure 11:
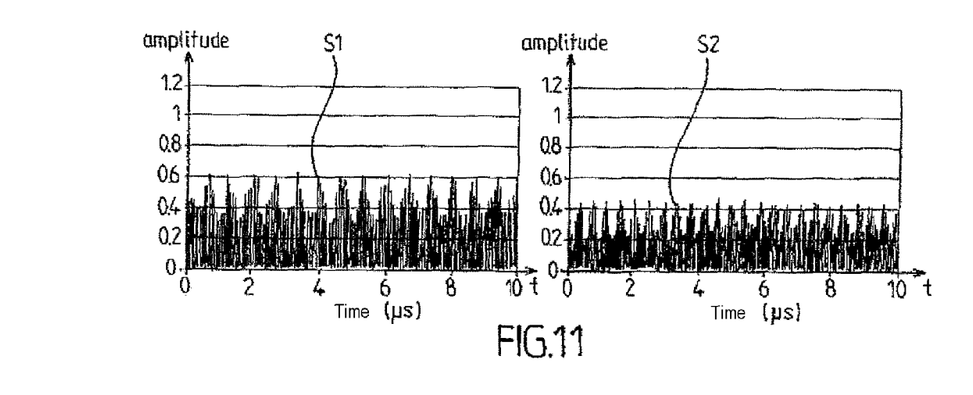
FIG. 11 is a graph showing two curves representing respectively, as a function of time, two sequences of permanent noises.

The scenario of permanent noises represents the noises which are emitted by sources which emit continually or with a known and constant periodicity, for example radio-broadcasting transmitters or permanently operational power supplies. The amplitude of the permanent noise can vary slightly in the course of time, especially in order to simulate the fact that one is moving away from or toward a transmitter. It will be noted that the permanent noises generally possess known and fixed frequencies. The scenario of permanent noises consists of a set of sequences of permanent noises, which follow one another in a random manner over a total duration fixed by the user of the noise generator. FIG. 11 represents, by way of example, two sequences S1 and S2 of permanent noises.

Figure 13:
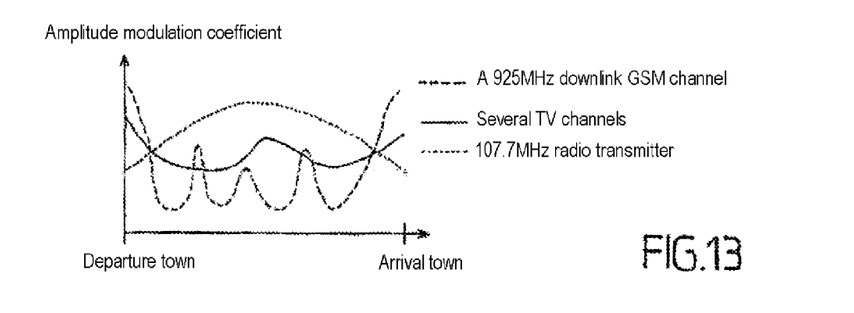
FIG. 13 is a graph showing an exemplary scenario of permanent noises.
Figure 14:
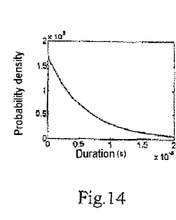
FIGS. 14 to 17 are graphs showing respectively the probability density of the duration, of the rise time, of the time interval and of the amplitude of the transient events of a first scenario of measurements.
Figure 15:
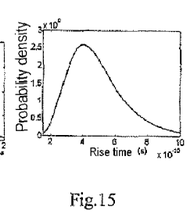
Figure 16:
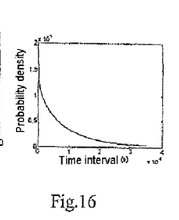
Figure 17:
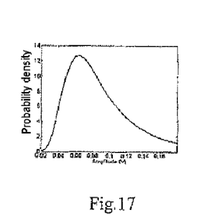
Figure 18:
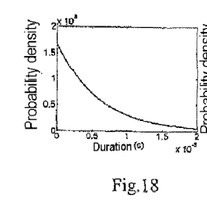
FIGS. 18 to 21 are graphs similar to FIGS. 14 to 17 for a second scenario of measurements.
Figure 19:
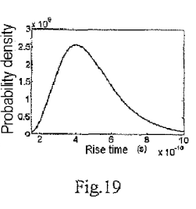

FIG. 13 shows an exemplary scenario of permanent noises. This scenario comprises a GSM carrier with a modulation of the amplitude which simulates the variation in transmitter distance, a modulation of the amplitude on the TV channels (it is considered that the transmitters of the various channels are located at the same places, thus the modulation of the amplitude which simulates the variation in distance between the onboard apparatus and the transmitters is the same for all the channels) and a modulation of the amplitude for an FM transmitter. The scenario of permanent noises is the sum of these various amplitude-modulated sinusoidal signals.

Figure 12:
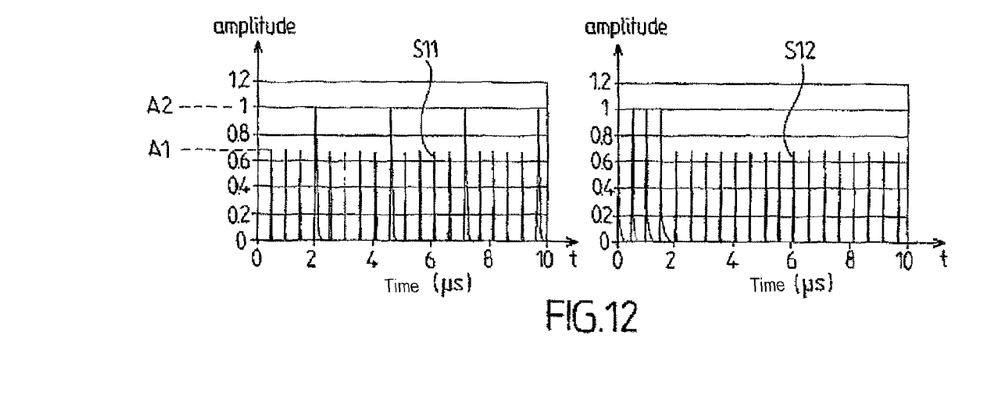
FIG. 12 is a graph showing two curves representing respectively, as a function of time, two sequences of transient noises.

The scenario of transient noises represents the noise emitted subsequent to sudden variations in current or voltage. This type of noise is noted with choppers, certain motors, actuators, switches, losses of catenary-pantograph contact or circuit breakers, for example. The transient noises generally cover wide frequency bands, which depend on the swiftness of the rising edge of the transient noise (rise time t1). The rise time t1 is characteristic of the device from which the noise originates (motor, actuator, or the like) and therefore the frequency band covered also. Moreover, the transient noises are generally repeated. For example, when windshield wipers are turned on, a transient noise may be noted, caused by the windshield wiper motor on each windshield wiper sweep. A transient noise with a repetition frequency which depends on the speed of the windshield wipers will then be noted. The scenario of transient noises consists of a set of sequences of transient noises, which follow one another in a random manner over a total duration fixed by the user of the noise generator. FIG. 12 represents, by way of example, two sequences S11 and S12 of transient noises.

The sequence S11 consists of the superposition of a first signal, corresponding to a transient disturbance which appears frequently, and of a second signal, corresponding to an infrequent transient disturbance. This is characterized by spikes of a first amplitude A1 appearing at a first frequency f1 and spikes of a second amplitude A2, with A2>A1, appearing at a second frequency f2, with f2<f1.

The sequence S12 consists of spikes appearing at the frequency f1, the first three spikes exhibiting an amplitude A2 greater than the amplitude A1 of the following spikes. This change of amplitude may be due, for example, to movement away from a transient noise source.

By way of example, in the case of an apparatus onboard a train, the disturbances comprise transient disturbances which appear frequently during the train's regular conditions of travel, infrequent transient disturbances which occur under particular conditions, for example when passing under a neutral section, and permanent disturbances which stem from radiotelephony, television, radio-broadcasting transmitters, or the like, situated along the tracks.

The method thus generates a scenario of noises by superimposing several permanent and transient noises. This makes it possible to provide scenarios of disturbances typical of certain environments or contexts, for example offices equipped with Wi-Fi devices, industrial settings, residential settings, means of transport, airbase, or the like. A noise scenario may at one and the same time contain intentional or unintentional permanent disturbances and transient disturbances. The transient disturbances may correspond to double exponentials, simple ones or ones modulated by a sinusoid centered on a frequency corresponding to the operating frequency band of the system that one wishes to test, especially in the case of a communication system. The temporal characteristics of double exponentials and their amplitude have distributions which follow statistical laws determined previously on completion of measurement campaigns.

The scenario of noises is thereafter used to program a signal generator, thereby making it possible in particular to test an apparatus, for example a telecommunication system (step 105). The telecommunications system may be tested at two levels.

A first level consists in subjecting the physical apparatuses (the transmitters and the receivers) of the telecommunication system to electromagnetic disturbances and in verifying that "the electronics" withstands this EM assault.

A second level consists in establishing a communication between a transmitter and a receiver of the communication system and in verifying that the information is correctly understood by the receiver in the presence of the electromagnetic disturbances. In this second case, the effect of the disturbances is tested not only on the apparatuses and on the useful signal but also on the telecommunication protocol in the case of modern systems. Indeed, new telecommunication systems employ relatively complex protocols, which may be very diverse and involve information redundancies so as to alleviate certain types of transmission error. The elements which can vary are the type of modulation, the frequencies, the number of channels, the time of use of the channel, the possible number of users on a frequency channel, the possibility or otherwise of changing channel if the channel is too noisy, the possibility of repeating the sending of the data if there has been no confirmation of reception. Thus according to their protocol, certain systems may be more sensitive to permanent disturbances on certain frequencies or more sensitive to repeated transient disturbances.

It will be noted that with the known test systems, only the effect of permanent disturbances on one channel at a time is tested. Now, in the case of recent telecommunication systems, when transient disturbances are generated, several frequency channels are covered simultaneously. Thus, even if the protocol makes it possible to change channel, the disturbances are not circumvented. In this case, it is the frequency of repetition of the transient disturbance which will probably be decisive in determining the quality of reception of the communication.

Thus, by generating scenarios comprising both permanent and transient noises, it is possible to implement relevant trials faced with any type of protocol.

It will be noted that the known noise generators are white noise generators, that is to say they produce noise which uniformly covers a broad frequency band. The frequency band covered is generally an invariant parameter which characterizes the type of apparatus. Conversely, the method according to the invention makes it possible to generate time-varying noise, thereby making it possible to take into account the parameters which define contemporary telecommunication systems, especially the parameters related to the telecommunication protocol (frequencies, number of channels, handover, repetition and duration of the binary messages) and the parameters which characterize the disturbances (amplitude, frequencies, duration, repetition). Stated otherwise, the method according to the invention makes it possible to simulate more realistic conditions.

The scenario of noises can also be employed to establish laboratory electromagnetic compatibility trials procedures representative of the circumstances that will be encountered by the sensitive apparatus in its everyday use.

In one embodiment of the invention, the method comprises an additional step in which a user fixes parameters, for example the length and the duration of the journey, the maximum speed, the type of electrification of the line, the age or the state of the catenary, the existence of neutral sections and the type of zone (rural or urban). These parameters are thereafter taken into account by the method to determine the chances of the disturbances appearing and the amplitudes attained.

It is also possible to fix characteristics relating to the input stage of the system (response of the reception antenna, filter) in such a way as to correct the disturbances so as to offer a scenario of disturbances that is representative of what is actually received by the telecommunication system.

By way of example, the case of the transient noises received by an antenna situated on a train will now be described in greater detail.

For each temporal and amplitude parameter, the laws remain the same (log normal law for example). On the other hand, the parameters of the statistical laws change as a function of the following two points:

The place where the transmit/receive antenna of the system that one wishes to protect is fixed (distance between pantograph and GSM-R antenna). A change in the position of the antenna has an impact mainly on the parameters of the law which controls the amplitudes of the transient noises. In addition, even for a constant position of the transmit/receive antenna of the system, it is possible to choose to change the parameters of the law which controls the amplitudes of the transients so as to vary them and thus test the immunity of the system faced with conditions of transient EM noises of higher amplitudes, for example during the presence of severe meteorological conditions (significant moisture, ice on the catenary, or the like).

The operating conditions under which the system to be protected is deployed (speed, electrification, age of the catenary, or the like). A change in the operating conditions has an impact mainly on the parameters of the law which controls the time intervals which separate two transient events. Generally, the operating conditions have no impact on the statistical characteristics of the rise times, durations or amplitude of the transient EM disturbances.

On the basis of these analyses and by making the assumption of a local linear regime, new scenarios of noises, which have not necessarily been measured previously, may be composed. Indeed, the method can for example use a law which governs the distribution of the amplitudes for an antenna placed 5 m from the pantograph and a law which governs the time intervals at a speed of 250 km/h of the train, without this situation having been implemented and measured previously.

To illustrate this case, four scenarios of measurements are described below.

A first scenario corresponds to a cruising speed of 100 km/h and a GSM-R antenna fixed 1 meter from the pantograph.

The temporal and amplitude characteristics of the transient events which make up the generated scenario of noises follow predefined statistical laws, whose probability density functions are represented in FIGS. 14 to 17.

Referring to FIGS. 18 to 21, a second scenario corresponds to a cruising speed of 300 km/h and a GSM-R antenna fixed 1 meter from the pantograph.

Figure 20:
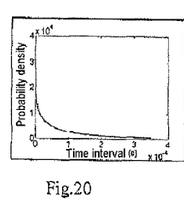
Figure 21:
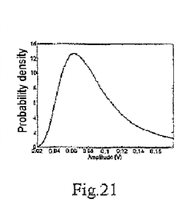
Figure 22:
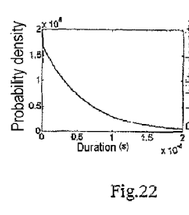
FIGS. 22 to 25 are graphs similar to FIGS. 14 to 17 for a third scenario of measurements.
Figure 23:
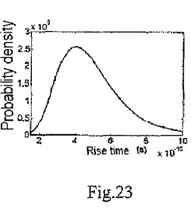
Figure 24:
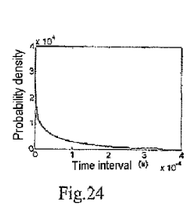

At constant position of the antenna and with the same train operating conditions, the duration, the rise time and the amplitude of the transient events retain the same distributions. On the other hand, increasing the speed of the train introduces a change regarding the occurrence of the transient events. This impacts the statistical law for the time intervals which separate two transient events (FIG. 20). To generate a new scenario of transient noises, it is therefore necessary to adapt the statistical parameters of the law which controls the time intervals.

Referring to FIGS. 22 to 25, a third scenario corresponds to a cruising speed of 300 km/h and a GSM-R antenna fixed 3 meters from the pantograph.

Figure 25:
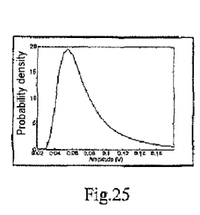
Figure 26:
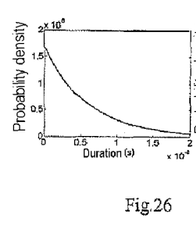
FIGS. 26 to 29 are graphs similar to FIGS. 14 to 17 for a fourth scenario of measurements.
Figure 27:
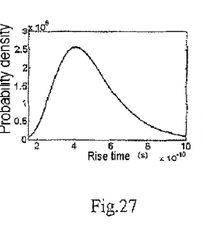

By fixing the GSM-R antenna 3 meters from the pantograph and by maintaining the speed of the train at 300 km/h, only the parameters of the statistical law which controls the amplitudes of the transient events change with respect to the conditions of the second scenario (FIG. 25).

The displacement of the position of the antenna from 1 meter to 3 meters increases the density of the transient events of low amplitudes and reduces the density of the high-amplitude transient events.

Referring to FIGS. 26 to 29, a fourth scenario corresponds to a cruising speed of 100 km/h and a GSM-R antenna fixed 3 meters from the pantograph.

Figure 28:
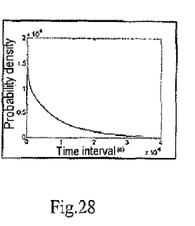
Figure 29:
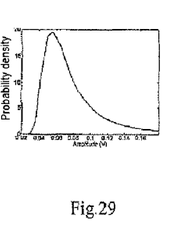

Decreasing the speed of the train from 300 km/h to 100 km/h entails a reduction in the recurrence of the transient events with respect to the third scenario, therefore a decrease in the density of the short time intervals and an increase in the density of the largest time intervals (FIG. 28).

To generate noise scenarios, the method therefore determines the laws for the durations and rise times which remain stable in the cases presented. Nonetheless, in a case where one was interested in another reception antenna situated on the train and possessing various passbands, the parameters of the laws for the rise times and durations could be adjusted so as to take into account the characteristics of this second antenna.

The method selects:
a law for the time intervals which depend on the speed at which the system must operate, this law possibly corresponding to a law established on the basis of measurement or a law extrapolated on the basis of other cases. For example, the method can extrapolate a law at 200 km/h if it has access to data relating to laws measured at 100 km/h and 300 km/h.
a law for the amplitudes which depend on the position at which the antenna will be placed. As previously, the method can extrapolate certain laws.

On the basis of these laws, the method generates a table featuring successive values corresponding to rise times, to durations, to time intervals and to amplitudes. The transient noises which follow one another in the scenario are defined by the values present in each of the columns. The number of columns of the table depends on the duration of the scenario that one wishes to implement.

Although the invention has been described in relation to several particular embodiments, it is very obvious that it is in no way limited thereto and that it comprises all the technical equivalents of the means described as well as their combinations if the latter come within the scope of the invention.

The invention claimed is:
1. A method of generating a scenario of electromagnetic noises for monitoring the reliability of a sensitive apparatus, the method comprising:
defining environmental electromagnetic conditions relating to an environment of the sensitive apparatus, the environment being a train;
determining a positioning of the sensitive apparatus in said environment; and
generating, based on said environmental electromagnetic conditions and of said positioning of the sensitive appa- ratus, a scenario of electromagnetic noises comprising a set of permanent noises and a set of transient noises; and fixing at least one parameter from among a length of a journey, a duration of the journey, a maximum speed, a type of electrification of the line of the train, an age or a state of a catenary and an existence of neutral sections, said at least one parameter being taken into account to generate said scenario of electromagnetic noises, wherein one or more processing devices are configured to perform at least one of the defining, the determining, the generating, and the fixing.

2. The method as claimed in claim 1, further comprising programming a signal generator with said scenario of electromagnetic noises; and transmitting, with assistance of said signal generator, a signal corresponding to said scenario of electromagnetic noises destined for said sensitive apparatus.

3. The method as claimed in claim 2, further comprising fixing at least one characteristic relating to an input stage of said sensitive apparatus, said at least one characteristic being taken into account to generate said scenario of electromagnetic noises.

4. The method as claimed in claim 1, further comprising fixing at least one characteristic relating to an input stage of said sensitive apparatus, said at least one characteristic being taken into account to generate said scenario of electromagnetic noises.

5. A digital machine configured to execute the method of generating a scenario of electromagnetic noises as claimed in claim 1.

6. A signal generator programmed with the scenario of electromagnetic noises obtained by the execution of the method of generating a scenario of electromagnetic noises as claimed in claim 1.

7. A method of generating a scenario of electromagnetic noises for monitoring the reliability of a sensitive apparatus, the method comprising:

defining environmental electromagnetic conditions relating to an environment of the sensitive apparatus;

determining a positioning of the sensitive apparatus in said environment;

generating, based on said environmental electromagnetic conditions and of said positioning of the sensitive apparatus, a scenario of electromagnetic noises comprising a set of permanent noises and a set of transient noises;

programming a signal generator with said scenario of electromagnetic noises;

transmitting, with assistance of said signal generator, a signal corresponding to said scenario of electromagnetic noises destined for said sensitive apparatus; and fixing at least one characteristic relating to an input stage of said sensitive apparatus, said at least one characteristic being taken into account to generate said scenario of electromagnetic noises, wherein one or more processing devices are configured to perform at least one of the defining, the determining, the generating, the programming, the transmitting and the fixing.

* * * * *

UNITED STATES PATENT AND TRADEMARK OFFICE
CERTIFICATE OF CORRECTION

PATENT NO. : 8,653,831 B2  Page 1 of 1
APPLICATION NO. : 13/003605
DATED : February 18, 2014
INVENTOR(S) : Deniau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this
Twenty-ninth Day of September, 2015

Michelle K. Lee
*Director of the United States Patent and Trademark Office*